June 23, 1970 R. W. PREISING 3,516,432
SELF-SEALING VALVE
Filed April 10, 1968

INVENTOR.
RICHARD WILLIAM PREISING
BY Knox & Knox

United States Patent Office 3,516,432
Patented June 23, 1970

3,516,432
SELF-SEALING VALVE
Richard William Preising, Bldg. 17, Apt. A, 31820 Dolly Madison Drive, Madison Heights, Mich. 48071
Filed Apr. 10, 1968, Ser. No. 720,153
Int. Cl. F16k *43/00*
U.S. Cl. 137—329.02                    3 Claims

ABSTRACT OF THE DISCLOSURE

The valve has a reversible floating valve element which can be sealed in two positions, either by fluid pressure in the valve or by screw clamp means. The valve element has sealing portions of novel configuration which prevent knocking or hammering at the instant of cut-off or starting of the fluid flow, and means is provided to hold the valve element at any selected open position for control of flow rate.

BACKGROUND OF THE INVENTION

The present invention relates to valves and specifically toa self-sealing valve.

Valves of the self-sealing type, wherein the valve is held closed by pressure in the system in which the valve is installed, have certain problems unique to the type. Since the valve element is usually floating, or has some freedom, there is a tendency for the valve element to flutter or vibrate at the instant of closing or opening, when the fluid flow is greatly restricted and the flow rate is changed abruptly. This causes knocking or hammering in the system and is very objectionable. Also, if the fluid pressure drops too far, the valve may open inadvertently.

SUMMARY OF THE INVENTION

The valve described herein eliminates hammering by using a valve element shaped to avoid any sharp edges which could initiate vibration. There are two closed positions for the valve element, which is double sided and reversible, one position being held by internal pressure and the other position being held by a screw clamp, for positive sealing regardless of pressure changes. The clamp incorporates means for holding the valve element at any selected open position and the structure is designed to require a minimum of precisely machined surfaces.

BRIEF DESCRIPTION OF THE DRAWING

Similar characters of reference indicate similar or identical elements and portions throughout the specification and throughout the views of the drawing.

DESCRIPTION OF THE PREFERRED EMBODIMENT

Figure 1:
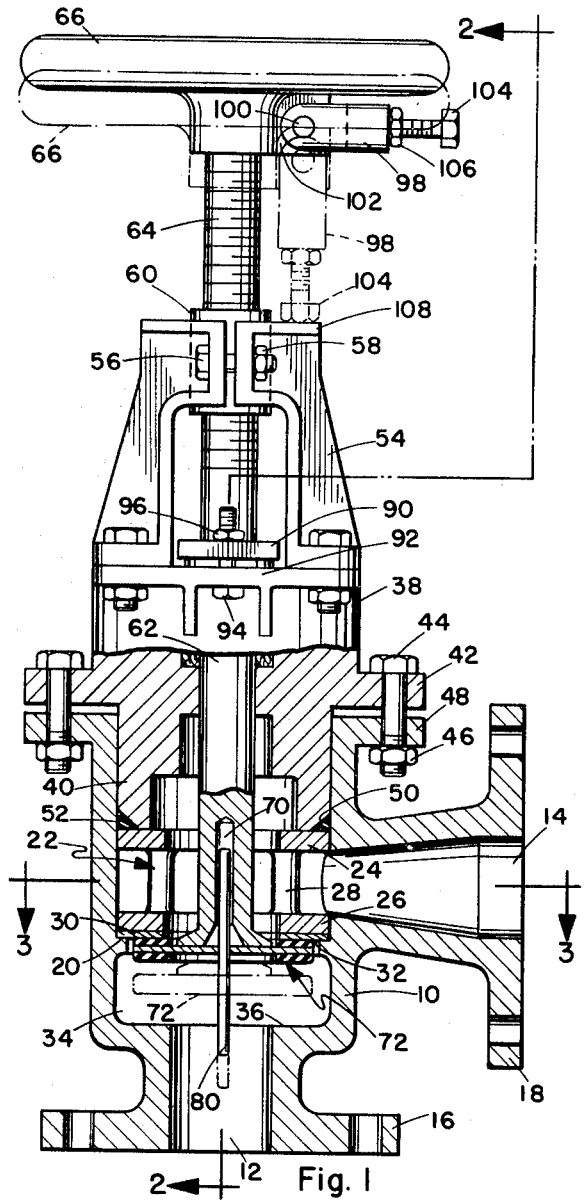
FIG. 1 is a side elevation view, partially sectioned, of the complete valve, with the valve element in the pressure sealed position.

The structure is shown applied to an angle valve but is applicable to other types.

The valve comprises a hollow body 10 of generally cylindrical configuration, with an inlet 12 at the lower end and an outlet 14 at the side, both being shown with conventional attachment flanges 16 and 18, respectively. Below outlet 14 the body has an inwardly projecting annular shoulder 20, on top of which rests an insert spacer 22, comprising an upper ring 24 and a lower ring 26, separated by posts 28. The rings 24 and 26 straddle outlet 14 and the spacer is sealed against shoulder 20 by a ring gasket 30, which projects radially inwardly from the shoulder and forms the upper valve seat 32. The interior of body 10 below spacer 22 comprises a valve chamber 34 and the lower valve seat 36 is formed by the machined lower end of the chamber surrounding inlet 12. The provision of valve seat 32 on the insert spacer permits this valve seat to be easily machined separately from the body 10 yet, on assembly of the valve, this valve seat 32 is substantially equal dimensionally to the valve seat 36, this result being accomplished without difficult machining operations. Spacer 22 is is held securely in place by a bonnet 38 having a plug portion 40 which fits closely into the upper end of body 10 and bears on top of the spacer. Bonnet 38 has an outer flange 42, which is secured by bolts 44 and nuts 46 to a corresponding flange 48 on body 10. The lower end of plug portion 40 has a bevelled outer edge 50 forming a channel for an O-ring 52 to seal against spacer 22 and, to ensure adequate clamping pressure, the length of the plug portion is such that a small gap remains between flanges 42 and 48 when the bolts are tightened.

Secured on top of bonnet 38 is a split yoke 54, the upper end of which is clamped by bolts 56 and nuts 58 to hold a threaded nut collar 60. Axially rotatably mounted in bonnet 38 is a stem 62, having a threaded portion 64 which extends upwardly through nut collar 60 and is fitted with a hand grip or wheel 66 at the upper end. Stem 62 has an outwardly flared lower end 68 and an axial bore 70 open at the lower end.

Within the valve chamber 34 is a valve element 72, comprising a flat imperforate disc 74 with similar peripheral seal rings 76 and 78 bonded to the upper disc. The seal rings are of rubber or comparable material with suitable resiliency and have an inner diameter slightly greater than the diameter of flared end 68, so that the stem 62 can seat on the disc 74. Fixed axially through the center of disc 74 is a guide pin 80, which is a loose fit in bore 70 and holds the valve element in alignment, the pin extending on both sides so that the valve element is invertable. The seal rings 76 and 78 have smoothly rounded outer edges 82 and it is this feature which prevents hammering. When a conventional resilient type valve element with a sharp or near sharp edge is very close to the closed position, the restricted fluid flow tends to curl or deform the edge, which then springs back, and a chattering or vibrating action starts. This prevents the valve element from seating properly, particularly in the self-sealing or pressure sealed position and hammering may continue for some time. By using the rounded edges the seals are prevented from curling and fluid flow is smooth up to the instant of cut-off.

To prevent leakage around the stem 62 the upper portion of bonnet 38 has a socket 84 to receive packing 86 around the stem, the packing being clamped tightly by a plug collar 88 fitting into the socket. The plug collar has extended bar portions 90, which are secured to flanges 92 on the upper end of bonnet 38 by means of bolts 94 and nuts 96, to apply downward clamping pressure on packing 86, the arrangement being well known.

Figure 2:
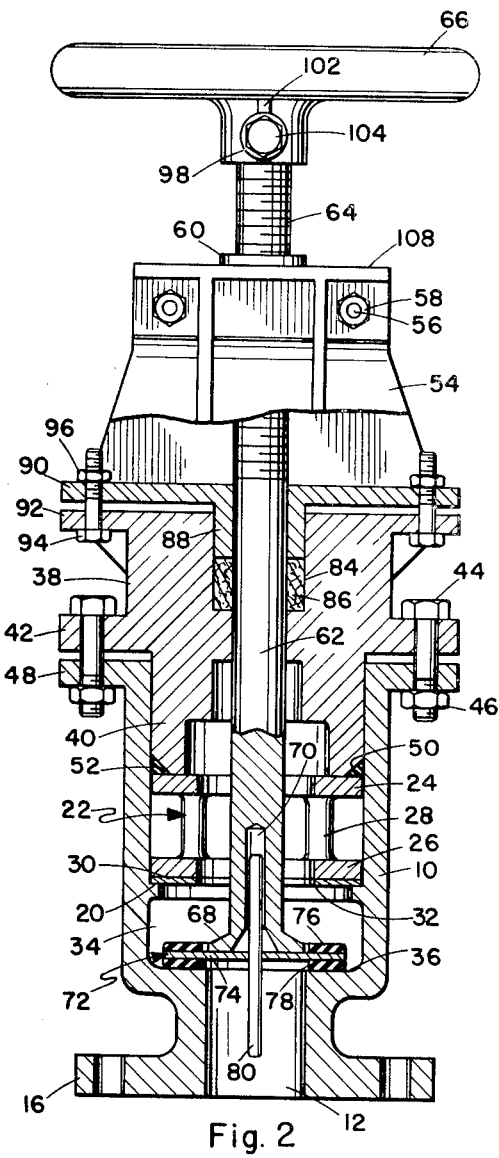
FIG. 2 is a sectional view taken on line 2—2 of FIG. 1, but with the valve element in clamped position.
Figure 3:
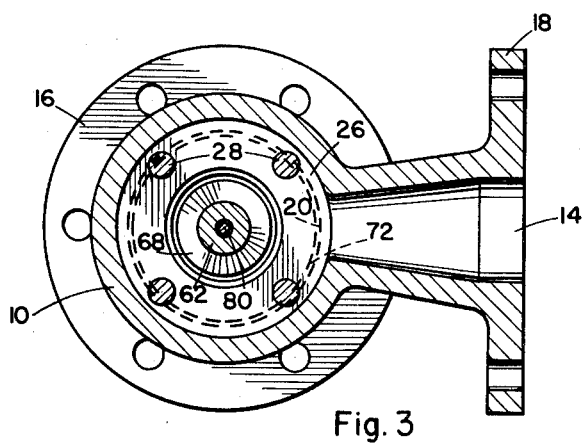
FIG. 3 is a sectional view taken on line 3—3 of FIG. 1.
Figure 4:
FIG. 4 is an enlarged sectional view of the valve element.

When the stem 62 is raised, as in the full line position in FIG. 1, fluid pressure at inlet 12 will lift the valve element 72 until the seal ring 76 seats firmly on upper valve seat 32 to shut off the flow. Fluid pressure will then hold the valve closed. If positive shut off is required, regardless of pressure, the hand grip 66 is turned to screw the stem 62 down and clamp the seal ring 78 against the lower valve seat 36, as in FIG. 2. At all times the valve element is aligned and centered by the guide pin 80 in bore 70 and the valve element is capable of withstanding considerable pressure due to the large support area of the flared end 68 of the stem.

The valve element 72 can be held at any selected open position between the valve seats to control the rate of flow, by turning the hand grip to raise or lower stem 62, inlet pressure holding the valve element against the end of the stem. To enable the valve element to be positioned accurately at a predetermined position, the hand grip 66 is provided with a stop 98 pivotally attached by a pin 100 to a lug 102 on the underside of the hand grip. A stop screw 104 is threaded into the end of stop 98 and is locked at any required position by a lock nut 106. In the retracted position shown in full line in FIG. 1, the stop is generally horizontal under the hand grip and does not interfere with operation of the valve. When extended, the stop is alongside the stem 62 and stop screw 104 engages the top flange 108 of yoke 54 when the stem is turned down to the predetermined position, so stopping further motion of the stem, as in broken line in FIG. 1. In this position the valve element 72 is held open, the position being variable by adjustment of stop screw 104.

Since the screw type action of the valve results in a slow closing rate, as compared to a snap action valve, the elimination of hammering is important. With the valve element necessarily concealed, the precise point of closing is not readily seen and a pause at a critical position of the valve could result in hammering which might damage the fluid system. However, the rounded edges of the valve element avoid this and operation of the valve is not critical.

I claim:

1. A valve, comprising:
    a hollow body having an inlet and an outlet, and a valve chamber between said inlet and outlet;
    a valve seat machined directly onto said body at the inlet end of said valve chamber;
    a small insert spacer removably supported in said valve chamber and having a valve seat confronting said valve seat and spaced therefrom at the opposite end of said valve chamber and of substantially the same dimensions as the first mentioned valve seat;
    a valve element in said valve chamber, having resilient seal elements on opposite sides thereof for sealing engagement selectively with said valve seats, the peripheral edges of said seal elements being smoothly rounded;
    said valve element being held against the valve seat remote from said inlet by pressure at the inlet;
    adjustable actuating means connected to said valve element to hold the valve element against the first mentioned valve seat and at intermediate positions between the valve seats;
    said insert spacer being completely free from said actuating means.

2. The structure of claim 1, and including a shoulder in said valve chamber spaced from said inlet, said insert spacer being secured against said shoulder, and said insert spacer comprising two ring plates supported in spaced apart relation by rigid posts, one of said ring plates including the second mentioned valve seat.

3. The structure of claim 1, and including a hand wheel having stop means carried thereby and adjustably engaging the valve body to lock the stem at a predetermined position to hold said valve element open.

References Cited
UNITED STATES PATENTS

| | | | |
|---|---|---|---|
| 1,554,673 | 9/1925 | Heath | 251—107 X |
| 2,676,610 | 4/1954 | Hare | 137—454.6 |
| 2,911,995 | 11/1959 | Preising | 137—329.02 |

WILLIAM F. O'DEA, Primary Examiner

D. R. MATTHEWS, Assistant Examiner

U.S. Cl. X.R.
251—98, 107, 284